(12) United States Patent
Pollard et al.

(10) Patent No.: US 7,486,472 B2
(45) Date of Patent: Feb. 3, 2009

(54) STORAGE MEDIA TRANSFERRING METHOD AND APPARATUS WITHIN A MULTI-UNIT STORAGE APPARATUS

(75) Inventors: Christopher Anthony Pollard, Monument, CO (US); Michael Cranna, Loveland, CO (US)

(73) Assignee: Spectra Logic Corporation, Denver, CO (US)

( * ) Notice: Subject to any disclaimer, the term of this patent is extended or adjusted under 35 U.S.C. 154(b) by 508 days.

(21) Appl. No.: 11/087,790

(22) Filed: Mar. 23, 2005

(65) Prior Publication Data
US 2005/0219964 A1 Oct. 6, 2005

Related U.S. Application Data

(60) Provisional application No. 60/521,335, filed on Apr. 2, 2004.

(51) Int. Cl.
*G11B 15/68* (2006.01)
*G11B 7/085* (2006.01)

(52) U.S. Cl. .................................. 360/92; 369/30.27

(58) Field of Classification Search .............. 369/30.27, 369/30.48, 30.49, 30.46, 30.6, 30.63, 30.38, 369/30.39, 30.7, 30.75; 360/30.63, 92.1; 414/250
See application file for complete search history.

(56) References Cited

U.S. PATENT DOCUMENTS

| | | | |
|---|---|---|---|
| 4,932,826 A | 6/1990 | Moy et al. | |
| 5,479,581 A | 12/1995 | Kleinschnitz | |
| 5,700,125 A | 12/1997 | Falace et al. | |
| 5,836,735 A | 11/1998 | Yeakley et al. | |
| 6,011,669 A | 1/2000 | Apple et al. | |
| 6,059,509 A | 5/2000 | Ostwald | |
| 6,068,436 A | 5/2000 | Black et al. | |
| 6,550,391 B1 | 4/2003 | Ostwald et al. | |

(Continued)

FOREIGN PATENT DOCUMENTS

JP 2003162857 A * 6/2003
WO WO 2005/010661 A2 2/2005

OTHER PUBLICATIONS

U.S. Appl. No. 10/950,613, Starr et al.

(Continued)

*Primary Examiner*—Andrea L Wellington
*Assistant Examiner*—Matthew G Kayrish (57) ABSTRACT

Disclosed are methods and apparatuses for transferring storage media between storage units comprising an expandable multi-unit storage system. The expandable storage apparatus comprises a first and second storage unit comprising media support locations. The support locations are capable of supporting at least one storage media element. At least one storage device is adapted to store and retrieve data to and from the storage media element associated with at least one of the storage units. At least one robotic system is associated with each of the storage units. A media pass-through transfer device is substantially disposed in the first storage unit and is adapted to transfer the storage element between the first and second storage units wherein the media pass-through transfer device is capable of temporarily extending into the second storage unit. The robotic system is capable of transferring the storage media element between at least the support locations, the storage device and the media pass-through transfer device.

22 Claims, 9 Drawing Sheets

U.S. PATENT DOCUMENTS

| | | | |
|---|---|---|---|
| 6,574,173 B1 * | 6/2003 | Manes | 369/30.48 |
| 2002/0101685 A1 * | 8/2002 | Taki et al. | 360/134 |
| 2003/0113193 A1 * | 6/2003 | Ostwald et al. | 414/281 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0057847 A1 | 3/2005 | Armagost et al. | |
| 2005/0063089 A1 | 3/2005 | Starr et al. | |
| 2005/0065637 A1 | 3/2005 | Lantry et al. | |
| 2005/0185323 A1 | 8/2005 | Brace et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0246484 A1 | 11/2005 | Lantry et al. | |
| 2005/0267627 A1 | 12/2005 | Lantry et al. | |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Spectra Logic Corporation.
PCT Application No. US05/46447, Spectra Logic Corporation.

* cited by examiner

STORAGE MEDIA TRANSFERRING METHOD AND APPARATUS WITHIN A MULTI-UNIT STORAGE APPARATUS

CROSS-REFERENCE TO RELATED APPLICATIONS

This application claims priority to and the benefit of U.S. Provisional Patent Application No. 60/521,335 entitled: Data Cartridge Libraries with Pass-Through Port, filed on Apr. 2, 2004, the entire disclosure of which is hereby incorporated by reference.

FIELD OF THE INVENTION

The present invention relates generally to methods and apparatus for transferring storage media between storage units in a multi-unit storage system.

BACKGROUND

Data storage libraries, such as tape libraries having mobile media, are typically used to store and retrieve large amounts of data for data manipulation and archiving purposes. These libraries are typically comprised of drive devices adapted to read and write data to and from media that are often housed within the tape libraries. In some instances, additional storage capacity may be needed above and beyond the memory capacity associated with a given storage library. Solutions for increasing storage capacity can include the addition of more storage media to an existing library, data densification through compression routines, and replacement of existing storage media with higher density media when available.

Another technique for generating greater storage capacity is to expand a storage library with modular libraries to create a multi-module, or multi-unit, storage apparatus. Such expansion can present a number of new challenges in the context of storage apparatus operation. For instance, there may be advantages to transferring media among library modules, whereby a robotic system associated with each module can move the media within that module for reading/writing and/or archiving; hence, a system to transfer the media between or among modules may be required. Currently, transferring media between at least two adjacent modules is accomplished with conveyor systems that are permanently extended into the adjacent storage modules, such as an elevator spanning the two adjacent storage modules for example. In most cases, additional storage modules added to the multi-module storage apparatus require a new conveyor system that generally spans the entire storage apparatus. (The original conveyor system that was replaced is typically discarded.)

In an effort to provide an improvement in expanding multi-modular storage apparatuses capable of transferring media between the constituent modules, both methods and apparatus are proposed herein. It is to innovations related to this subject matter that the claimed invention is generally directed.

SUMMARY OF THE INVENTION

The present invention relates generally to methods and apparatus for transferring storage media between storage units in a multi-unit storage system.

One embodiment of the present invention can therefore comprise an expandable storage apparatus comprising: a first and a second storage unit comprising media support locations; said support locations capable of supporting at least one storage media element; at least one storage device adapted to store and retrieve data to and from said storage media element associated with at least one of said storage units; at least one robotic system associated with each of said storage units; a media pass-through transfer device substantially disposed in said first storage unit and adapted to transfer said storage element between said first and second storage units wherein said media pass-through transfer device is capable of temporarily extending into said second storage unit; said robotic system capable of transferring said storage media element between at least said support locations, said storage device and said media pass-through transfer device.

Another embodiment of the present invention can therefore comprise a method for extending storage capacity of a storage apparatus comprising: positioning a first and a second storage unit to cooperate with one another wherein said first storage unit comprises a media pass-through transfer device capable of holding a storage media element; extending said media pass-through transfer device at least partially into said second storage unit; and transferring said storage media element between said first and second storage units with said media pass-through transfer device.

Yet another embodiment of the present invention can therefore comprise a media transfer system comprising: a media pass-through transfer device adapted to be disposed in a first storage unit; said media pass-through transfer device adapted to receive a media element from a first robotic system cooperating with said first storage unit; said media pass-through transfer device capable of extending temporarily into a second storage unit; said media pass-through transfer device capable of transferring said media element to said second storage unit; said media pass-through transfer device adapted to transfer said media element to a second robotic system associated with said second storage unit.

Yet another embodiment of the present invention can therefore comprise an expandable media library comprising: a first library unit including at least one of a media support location and a storage device; a second library unit disposed adjacent to the first library and including at least one of a media support location and a storage device; a media pass through transfer device housed substantially within one of the first library and the second library, wherein the media pass through transfer device is movable from a first position substantially within the first library to a second position substantially within the second library.

DETAILED DESCRIPTION

Figure 1:
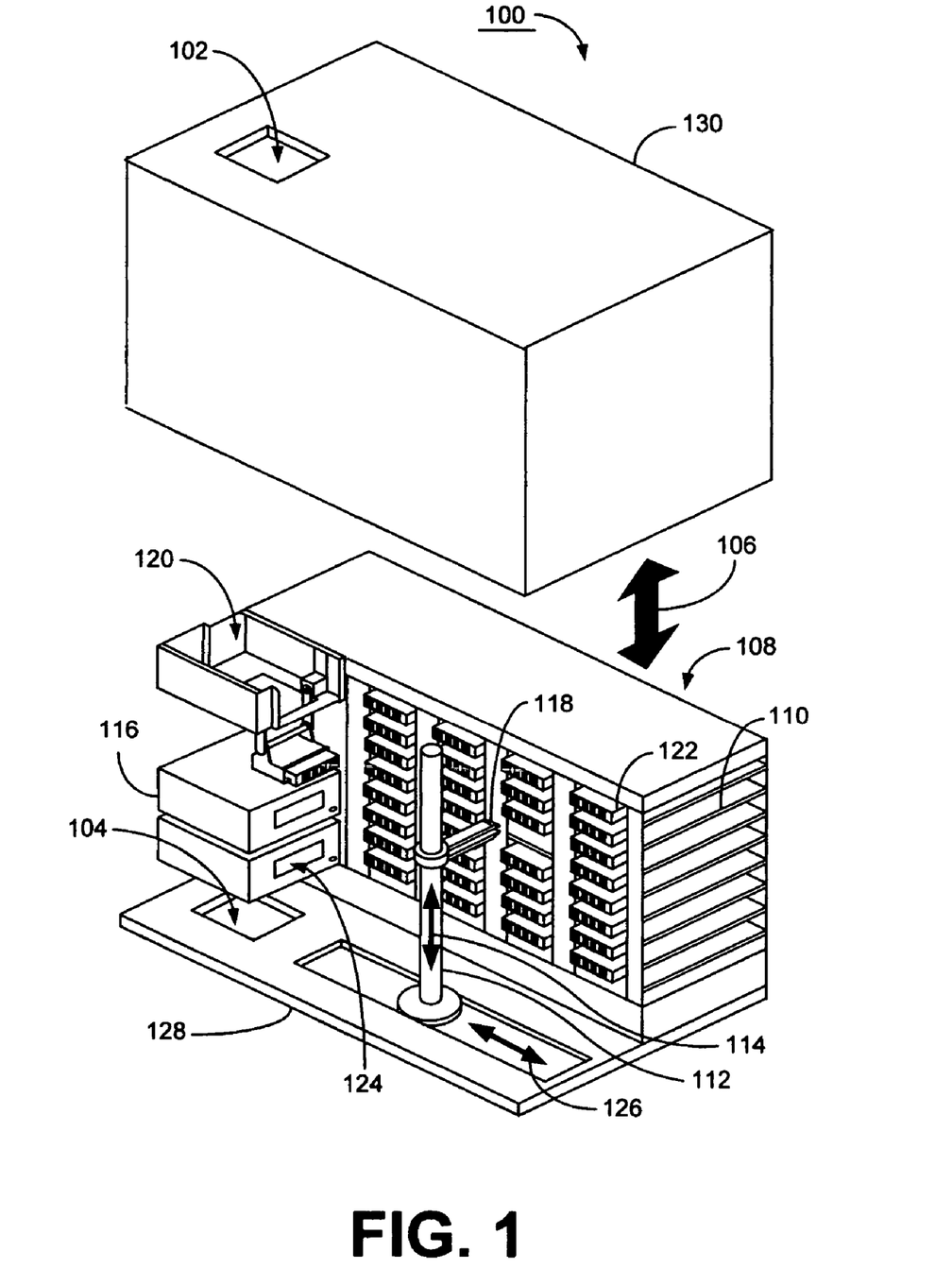
FIG. 1 is an exploded perspective view of a tape storage library constructed in accordance with an embodiment of the present invention.

Referring to the drawings in general, and more specifically to FIG. 1, shown therein is an exploded perspective view of a tape storage library 100, which is an embodiment of a storage unit, constructed in accordance with an embodiment of the present invention. In what follows, similar or identical structure is identified using identical callouts.

While the claimed invention has utility in any number of different applications, the tape storage library 100 of FIG. 1 has been provided to illustrate a suitable environment in which the claimed invention can be practiced. In this embodiment, the interior components 108 of the storage unit 100 generally comprise a plurality of storage media elements 122, support locations 110 (illustratively shown here as a shelving system) for the media elements 122, a robotic system 112, storage devices 116 and a media pass-through transfer device 120 all of which are substantially contained within an enclosure 130. Here, the storage elements 122 are tape cassettes which comprise storage tape medium (not shown). The storage elements 122 are disposed at support locations 110, in this case four cassettes 122 to a shelf 110.

In this embodiment, shown in FIG. 1, a tape cassette 122 can be transported between the support locations 110, the storage devices 116 and/or the media pass-through transfer device 120 by the robotic system 112. Here, the means for transporting the storage media element (such as tape cassette) 122 within the storage unit 100 is accomplished by positioning the robotic system 112 comprising a grasping device 118, illustrated here in a simplified representation, to the appropriate location. In this example, the grasping device 118 can move both in the vertical direction 114 and the horizontal direction 126 to fully access the necessary components within the library 100. As one of ordinary skill in the art will appreciate, the robotic system 112 could be constructed in a variety of alternative arrangements, such as by using a lead screw system or a belt and pulley system, just to name a couple of examples.

In FIG. 1, the robotic system 112 is capable of transporting storage media element (such as a tape cassette) 122 to or from one of the support locations 110 to the media pass-through transfer device 120. The robotic system 112 is also capable of grasping a storage media element 122 that may enter the library 100 through a first pass-through port 104 located in the base 128 of the library 100. The robotic system 112 is further capable of positioning a storage media element 122 to be received by a storage device 116 adapted to cooperate with a storage media element 122 for purposes of reading and writing data. The media pass-through transfer device 120 is capable of extending a storage media element 122 through an accommodating hole 102, or second pass-through port in this case, in the library cover 130 adapted to substantially enclose the interior components 108 as shown by the two way arrow 106. Here, the media pass-through transfer device 120 is shown configured to be similar in size and geometry to a storage device 116 to facilitate installation and removal of as a modular component, though the size and shape of the media pass-through transfer device is not required to be so to practice the invention. By swapping positions with a drive 116, the media pass-through transfer device 120 can be arranged to accommodate the transfer of a tape cassette 122 to at least one additional library 100 in the event two libraries 100 are positioned to share tape cassettes 122 as a single storage apparatus, to be discussed in more detail below.

Figure 2:
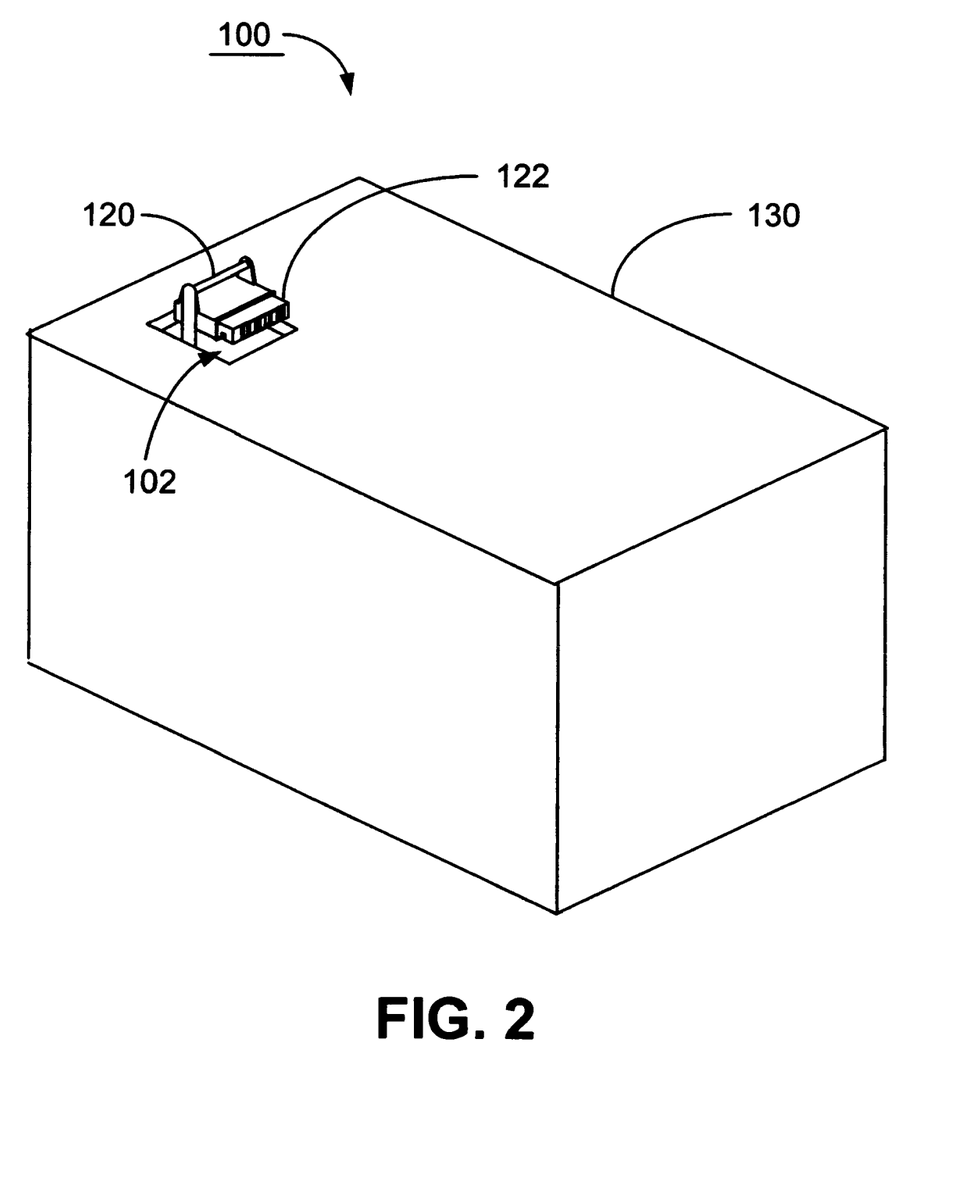
FIG. 2 is a perspective view of the library of FIG. 1 with a media pass-through transfer device holding a tape cassette extended beyond the library enclosure through a pass-through port consistent with embodiments of the present invention.

FIG. 2 is a perspective view of the library 100 with the media pass-through transfer device 120 holding a tape cassette 122 extended beyond the enclosure 130 through the second pass-through port 102. Here, the media pass-through transfer device 120 is substantially disposed in the library unit 100 and is capable of extending out of the library enclosure 130 temporarily. Hence, in this embodiment, the tape cassette 122 could be removed from the media pass-through transfer device 120 for use outside of the library 100.

Figure 3:
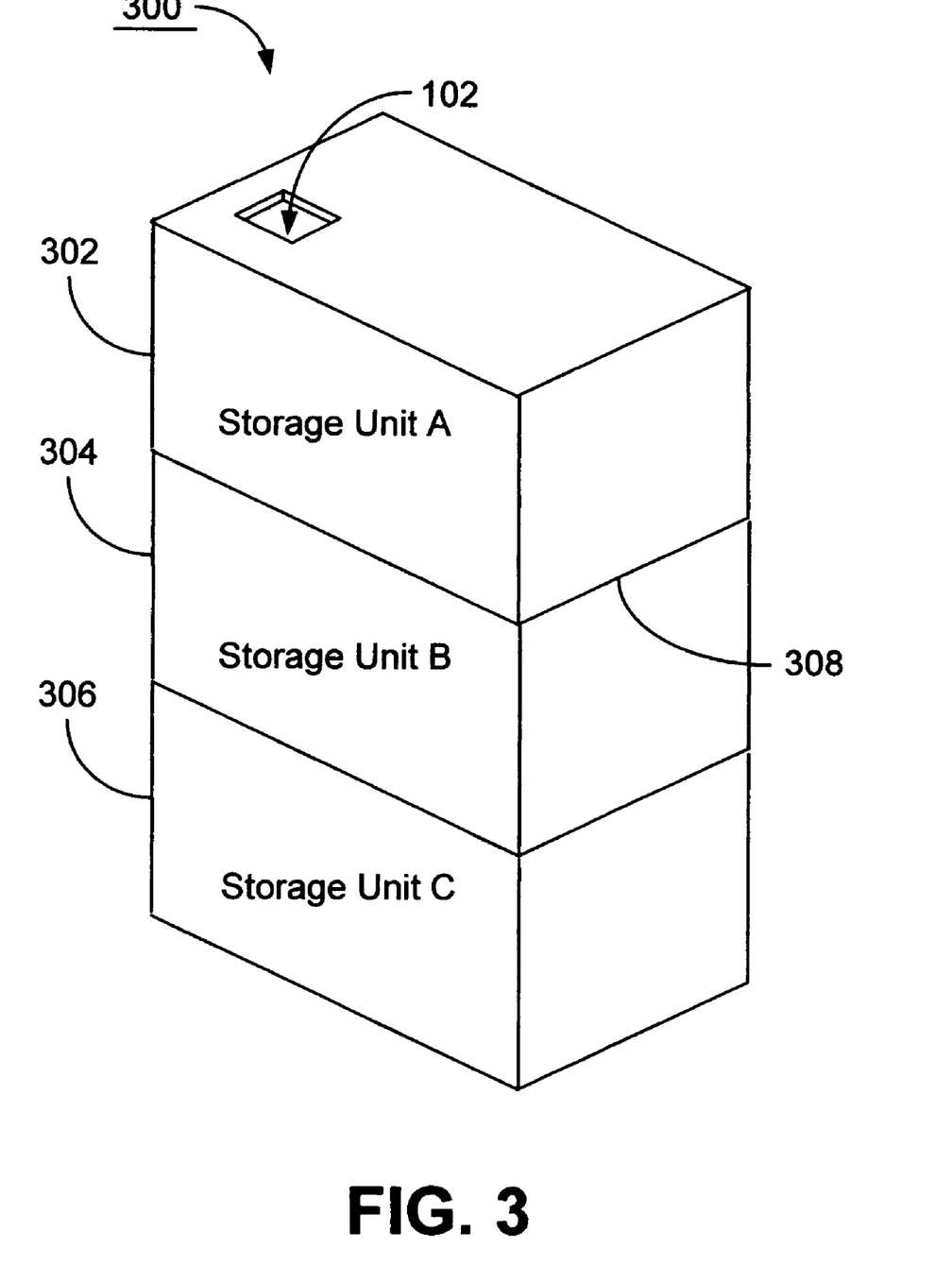
FIG. 3 is a perspective view of an expandable storage apparatus capable of transferring storage elements within the apparatus consistent with embodiments of the present invention.

FIG. 3 is a perspective view of an expandable storage apparatus 300 capable of transferring storage media elements 122 within the apparatus 300. The apparatus 300 shown in FIG. 3 comprises three of the tape storage libraries described in connection with FIG. 1, in a stacked configuration. In this embodiment, storage unit A 302 is stacked on top of storage unit B 304 which is stacked on top of storage unit C 306. Each of the storage units includes at least one pass-through port, such as the pass-through port 102. The pass-through ports 102 establish a pathway (not shown) between each storage unit, such as between storage units A 302 and B 304 when the pass-through ports 102 of the storage units are substantially aligned at the surfaces in proximity, such as the surface interfaces 308 between storage units A 302 and B 304 for example. The pathways are adapted to accommodate the transfer of a storage media element, such as the tape cassette 122, between the storage units, for example between storage units A 302 and B 304.

Figure 4:
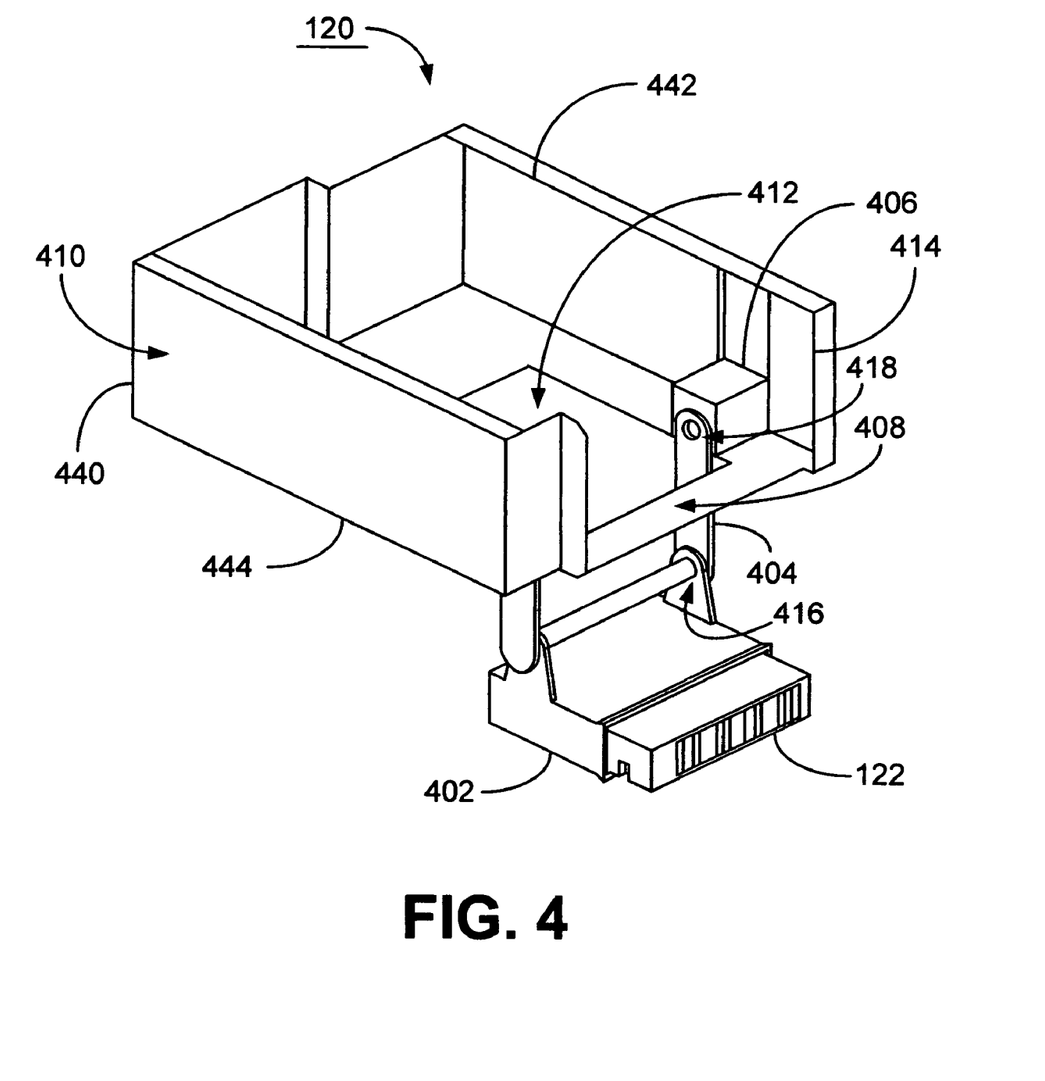
FIG. 4 is an embodiment of a media pass-through transfer device described in greater detail consistent with embodiments of the present invention.

With reference to FIG. 4, shown therein is an exemplary embodiment of a media pass-through transfer device 120 in greater detail. Here, the media pass-through transfer device 120 comprises a frame 410 with an interior space defined substantially by four lateral enclosures 440, a first side 442, and a second side 444; a cartridge holder 402 (shown holding a tape cartridge 122); a linkage 404 that extends between the frame 410 and the cartridge holder 402; and a means 406 to move the linkage 404 and cartridge holder 402 between the frame 410 exterior and interior. The means 406 to move the linkage 404 and cartridge holder 402 between the frame 410 exterior and interior could be accomplished by a motor system capable of pivoting the linkage 404 and cartridge holder 402 through an accommodating opening 412 in one or both of the first side 442 and the second side 444 of the frame 410. The linkage 404 could, for example, include a gear system (not shown) at the cartridge pivot points 416 and the moving means pivot point 418 capable of keeping the cartridge holder 402 in a constant facing direction. The media pass-through transfer device 120, in one embodiment, can be optionally similar in size to a storage device 116, such as that shown in FIG. 1, in order to provide added installation flexibility at a storage device 116 location within a library 100. The media pass-through transfer device 120, in this embodiment, also comprises a storage element receiving opening 408 located in the face 414 of the frame 410 capable of receiving a cartridge 122 when the cartridge holder 402 is substantially located in the frame 410.

Figure 5A:
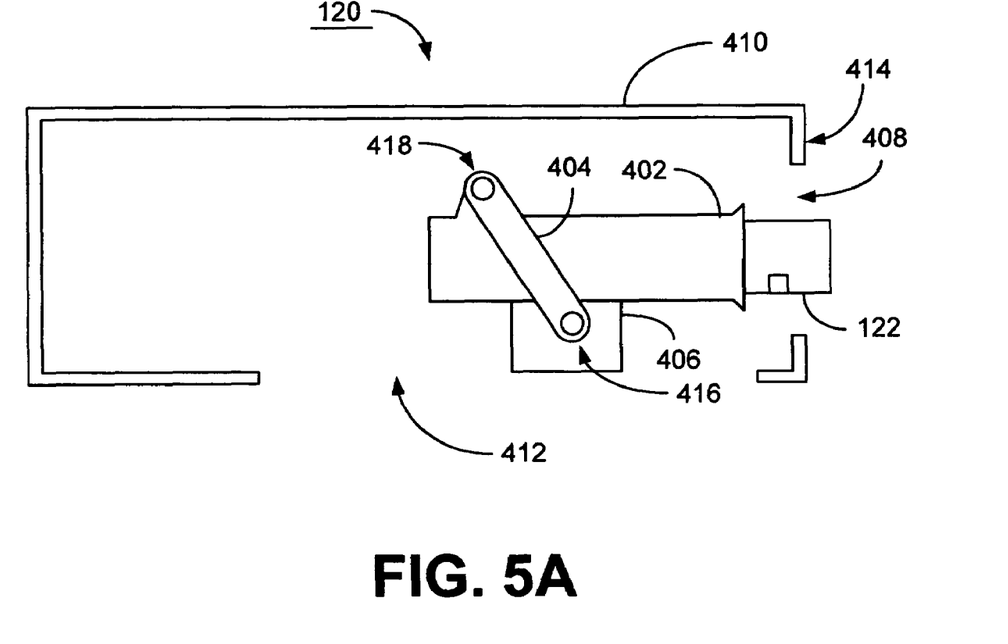
FIGS. 5A and 5B are side view cross-sectional illustrations of the media pass-through transfer device similar to the one described in FIG. 4, wherein a cartridge holder comprised by the device is shown, respectively, located at both the interior and exterior positions relative to the device's frame consistent with embodiments of the present invention.
Figure 5B:
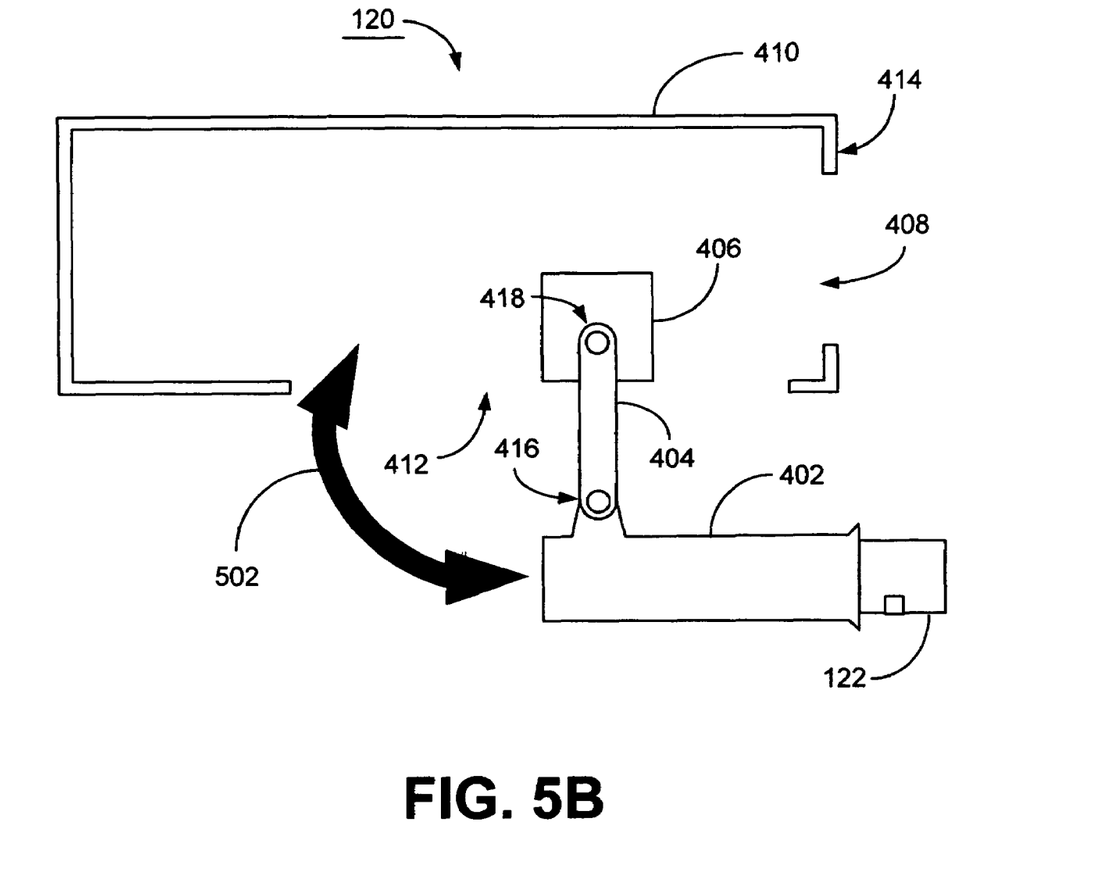

FIGS. 5A and 5B are side view cross-sectional illustrations of the media pass-through transfer device 120 similar to the one described in FIG. 4, wherein the cartridge holder 402 is shown respectively, located at both the interior and exterior positions relative to the frame 410. FIG. 5A shows the cartridge holder 402 in a retracted position disposed substantially within the interior of the frame 410. The linkage 404 is capable of retaining the cartridge holder 402 in the interior position capable of receiving a storage media element 122 through the receiving opening 408 located in the face 414 of the frame 410. FIG. 5B shows the cartridge holder 402 extended in the exterior position relative to the frame 410 through the accommodating opening 412 in the frame 410. Here, the cartridge holder 402 is operable to pivot, as shown by the two way curved arrow 502, from the position shown in FIG. 5A to the position shown in FIG. 5B. The linkage 404 is capable of retaining the cartridge holder 402 in the extended position whereby the cartridge holder is capable of receiving a storage media element 122. In this embodiment, a motor and gear system 406 could pivot the cartridge holder 402 between the interior and exterior positions relative to the frame 410.

Figure 6:
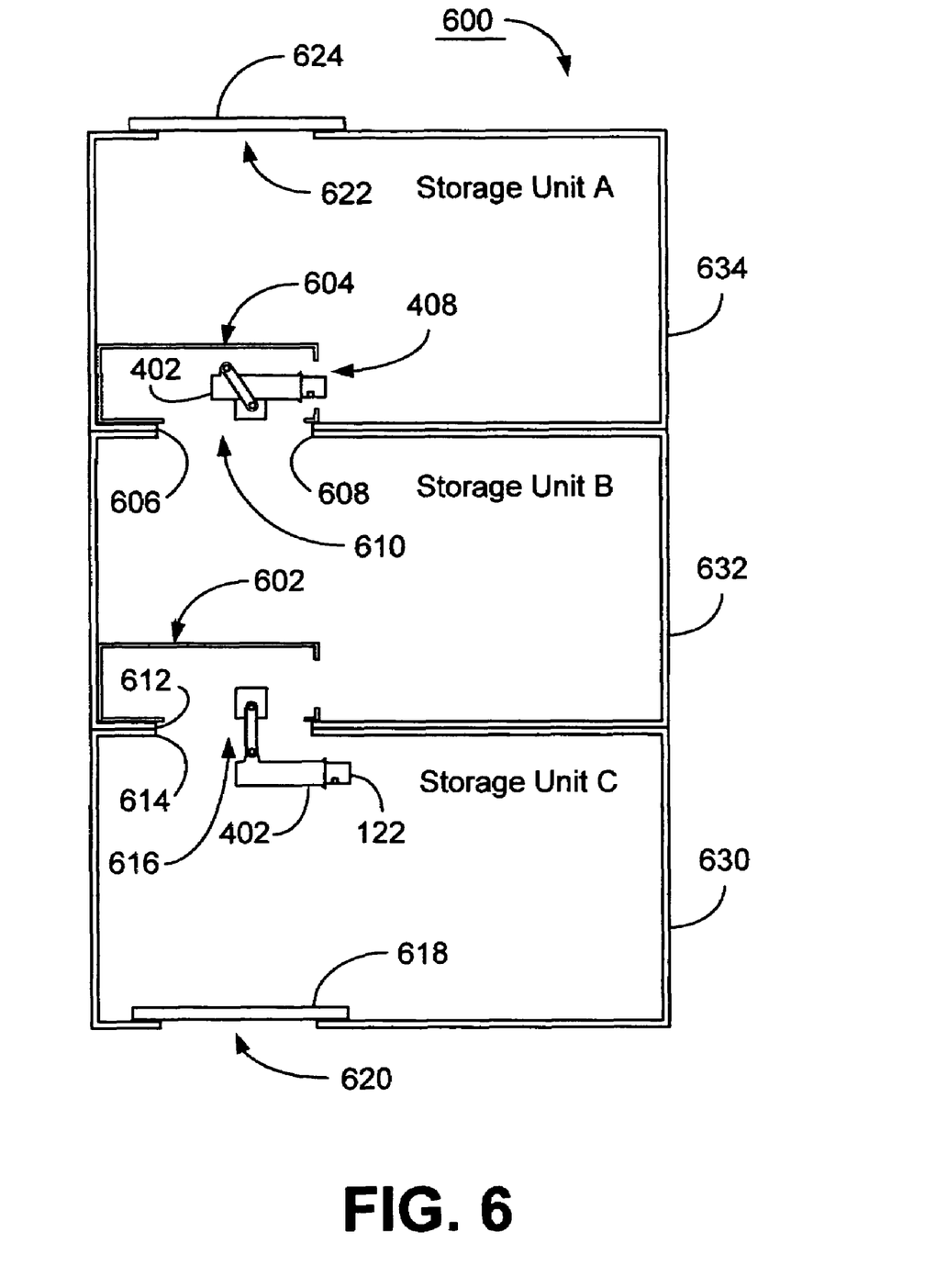
FIG. 6 a cross sectional view of an expandable storage apparatus capable of transferring storage elements between storage units consistent with an embodiment of the present invention.

Referring now to FIG. 6, shown therein is a cross sectional view of an expandable storage apparatus 600 according to the present invention that is capable of transferring storage media elements, such as tape cassettes 122, between storage units. In this embodiment, storage unit A 634 is stacked on top of storage unit B 632 which is stacked on top of storage unit C 630. There are first 604 and second 602 media pass-through transfer devices disposed in storage unit A 634 and storage unit B 632, respectively. Storage unit A 634 illustratively comprises an upper pass-through port 622 with an upper "knock-out" panel 624 that can be removed to establish a hole capable of accommodating the transfer of a storage media element, such as the cassette 122, through the upper pass-through port 622. Storage unit A 634 also comprises a lower pass-through port 606 that cooperates with an upper pass-through port 608 from storage unit B 632 to establish a first pathway 610 between storage unit A 634 and storage unit B 632. The first pathway 610 is established when the two pass-through ports 606 and 608 are substantially aligned and the two storage units (A 634 and B 632), and more specifically the mating surfaces comprising the pass-through ports 606 and 608, are in proximity, and in this case stacked. The first media pass-though transfer device 604 is capable of transferring a tape cassette 122 between storage unit A 634 and storage unit B 632 by extending the cartridge holder 402, loaded with the tape cassette 122, temporarily into storage unit B 632 through the first pathway 610. Likewise, a second pathway 616 is established when the lower pass-through port 612 of storage unit B 632 is cooperating with the upper pass-through port 614 of storage unit C 630. Here, the second media pass-though transfer device 602 is temporarily extended into storage unit C 630 and more specifically the cartridge holder 402 through the accommodating second pathway 616. Storage unit C 630 further comprises a lower "knock-out" panel 618 that can be removed to establish a hole capable of accommodating the transfer of a cassette 122 through the pass-through port 620. As illustrated in this embodiment, additional storage units and media pass-through transfer devices 120 can be added and combined, if desired, with storage units A 634, B 632 and C 630 to expand the storage capacity of the storage apparatus 600. Further as illustrated in this embodiment, a cartridge holder 402 is mounted to the inside of storage unit B 632, for example, which is one embodiment of a mounting relationship. In alternative embodiments of the present invention, the cartridge holder 402 is substantially housed in an associated storage unit, such as storage unit A 634 but can be mounted externally to the storage unit cover (such as the cover 130) and still be substantially disposed in an associated storage unit. It should be appreciated by one skilled in the art that the storage units, such as storage unit A 634 and B 632 could be arranged side by side or in some other configuration accommodating the general functionality of the media pass-through transfer devices, such as the first device 604, without departing from the scope of the invention. It should further be recognized by a skilled artisan that although, in this embodiment, a pivoting media pass-through transfer device 120 is described, other devices such as one capable of telescoping from one storage unit, such as A 634, into another, such as B 632, to transfer a storage media element could be included as another embodiment of the media pass-trough transfer device without departing from the scope and spirit of the invention.

Figure 7:
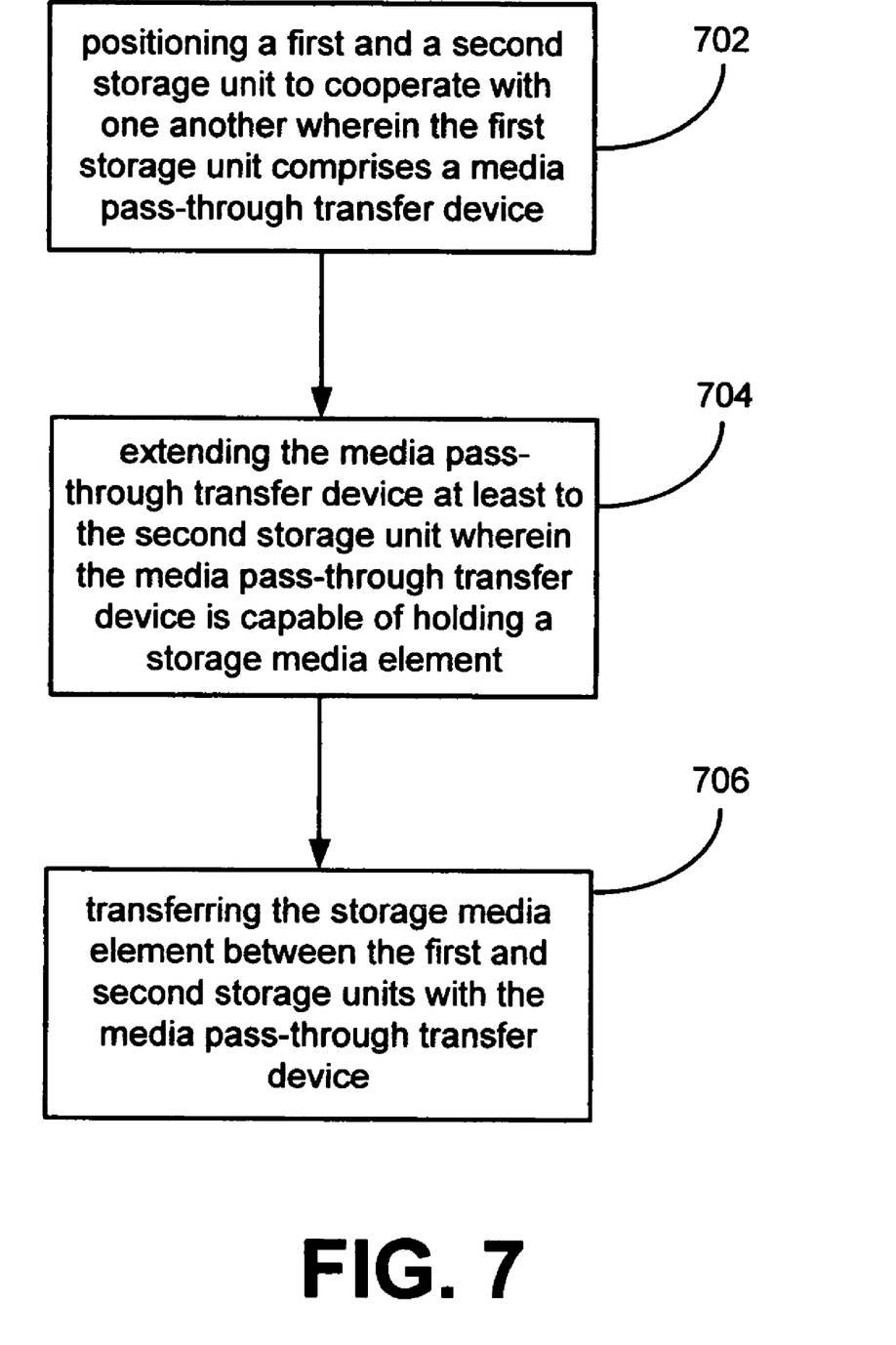
FIG. 7 is a method for extending a storage apparatus consistent with an embodiment of the present invention.

Referring now to FIG. 7, shown therein is a method for extending the capacity of a storage apparatus, such as storage apparatus 600 of FIG. 6 for illustrative purposes, consistent with an embodiment of the present invention. In step 702, a first and a second storage unit, such as storage unit A 634 and B 632 respectively, are positioned to cooperate with one another wherein the first storage unit, such as unit A 634, comprises a media pass-through transfer device, such as the first media pass-through transfer device 604. In cooperating, not only can the first and second storage units, such as unit A 634 and unit B 632, function together as an expanded storage apparatus, such as 600, but the first and second storage units are further adapted to exchange storage media elements, such as a tape cassette 122 through a pathway such as 610 for example. In step 704, the media pass-through transfer device is extended at least to the second storage unit, unit B 632, wherein the media pass-through transfer device, such as the first device 604, is capable of holding a storage media element, such as a cassette 122. In step 706, the storage media element, such as the cassette 122, is transferred between the first and second storage units, such as unit A 634 and B 632, with the media pass-through transfer device, such as the first device 604.

Figure 8:
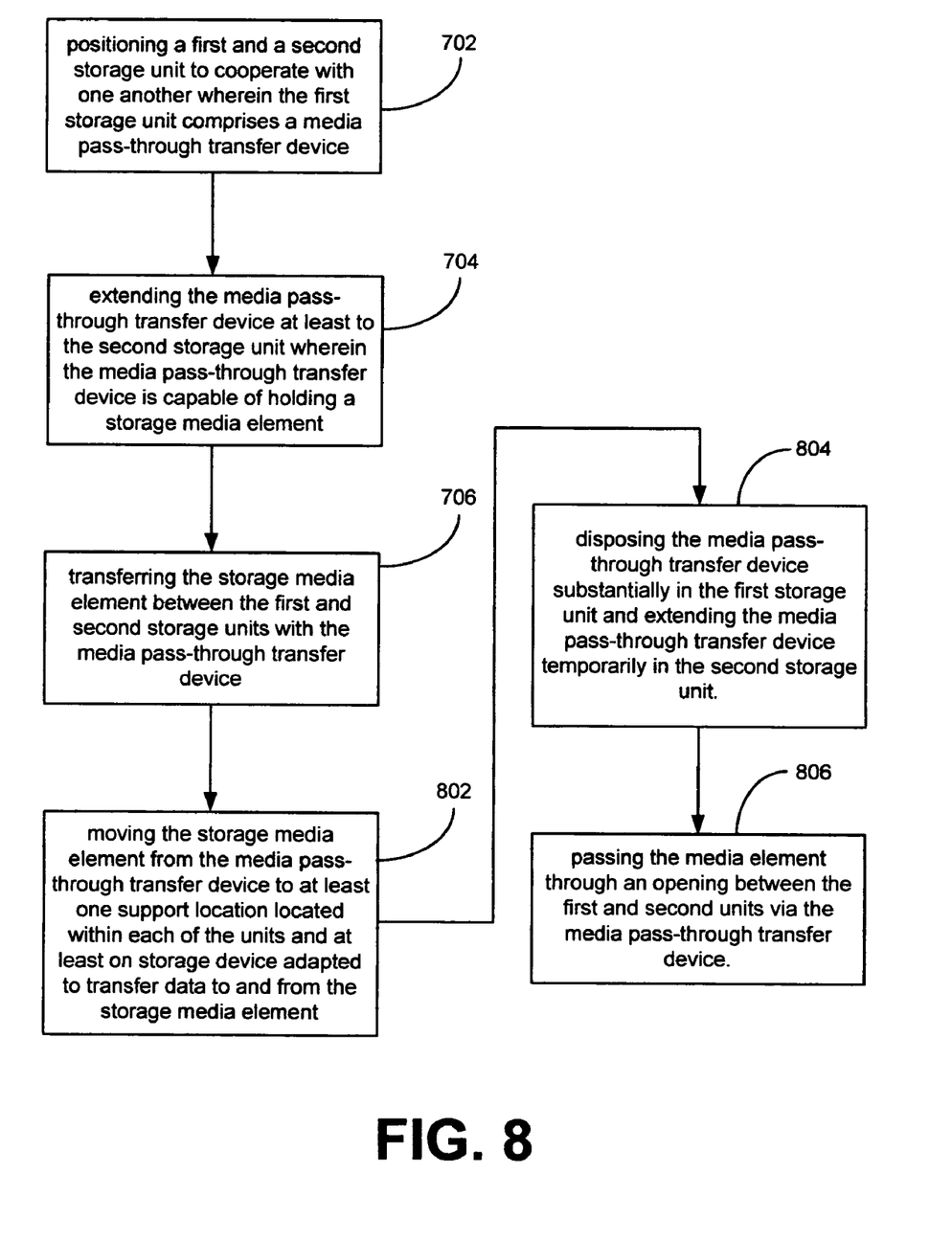
FIG. 8 shows alternative methods for extending a storage apparatus consistent with some embodiments of the present invention.

FIG. 8 shows some alternative embodiments of the present invention which includes method steps 702, 704 and 706 from FIG. 7. It should be recognized that the steps presented in the described embodiments of the present invention do not require any particular sequence. In step 802, the storage media element is moved from the media pass-through transfer device, such as the first device 604 from FIG. 6, to at least one of a support location, such as in the shelving system 110 of FIG. 1 (located within each of the units, such as unit A 634 and B 632) and a device (such as storage device 116 of FIG. 1 adapted to transfer data to and from the storage media element such as a tape cassette 122). This could be accomplished with a robotic system, such as the robotic system 112 of FIG. 1, which can be used to transfer a cassette 122, to and from the media pass-through transfer device, such as the first device 604, in each storage unit, such as unit A 634. In step 804, the media pass-through transfer device, such as the first device 604, is disposed substantially in the first storage unit, such as unit A 634, and is capable of extending the media pass-through transfer device temporarily into the second storage unit, such as unit B 632. Disposing a media pass-through transfer device, such as the first device 604, in a storage unit, such as unit A 634, allows for adding media pass-through transfer devices 120 as may be needed for each storage unit, such as unit C 630, that comprises the storage apparatus, such as 600. In step 806, the media element, such as the cassette 122, is passed through an opening between the first and second units, such as the first pathway 610, via the media pass-through transfer device, such as the first device 604.

Embodiments of the present invention could be commercially practiced with a T-120 tape cartridge library based storage apparatus from Spectra Logic Corporation of Boulder, Colo. Each T-120 library has a tape cassette holding capacity of one hundred and twenty LTO-2 tape cassettes located at support locations within the library in addition to as many as six LTO-2 full height drives adapted to read and write data from and to the cassettes. The drives and cassettes can be produced by IBM Corporation of Armok, N.Y. Each T-120 library is configured with an upper and lower pass-through port, similar to the pass-through ports 102 and 104 respectively of FIG. 1. The upper pass-through port is adapted to be covered by an upper "knock-out" panel, similar to the "knock-out" panel 624, and the lower pass-through port is adapted to be covered by a lower "knock-out" panel, similar to the "knock-out" panel 618 of FIG. 6. The T-120 libraries are configured to be stacked in an arrangement similar to FIG. 3. Each T-120 library comprises a robotic system capable of moving a tape cassette between all of the drive and support locations within the library. A Spectra Logic pivoting media pass-through transfer device, similar to the media pass-through transfer device 120 described in FIG. 4, is adapted to be disposed in place of a drive. A two T-120 library unit storage apparatus can be arranged with a second T-120 library unit stacked on a first T-120 library. In this arrangement, the upper "knock-out" panel of the first T-120 library unit and the lower "knock-out" panel of the second T-120 library unit are removed. The two exposed pass-through ports are substantially aligned at the mating surfaces of the two T-120 libraries to establish a pathway between the two T-120 library units. The designated drive space located nearest to the upper pass-through port of the first T-120 library is reserved as empty space and the media pass-through transfer device is disposed in the designated drive space located nearest the lower pass-through port of the second T-120 library unit. The pivoting media pass-through transfer device is capable of receiving a cassette in a cartridge holder, similar to the cartridge holder 402 of FIG. 4. An electric motor drives the cartridge holder between the first and second T-120 storage library units by temporarily extending the cartridge holder from the second library to the first library. The cartridge holder remains facing in substantially the same direction between pivot locations by a commonly used belt system running along the linkage, similar to the linkage 404. The cartridge holder can receive a cartridge from the robotic system in the first library when the holder is extended into the empty space located nearest to the upper pass-through port of the first T-120 library. The pivoting media pass-through transfer device can then move the cassette from the first library to the second library and transfer the cassette to a robotic system in the second library. Additional T-120 libraries could be stacked and adapted as described for the first and second T-120 libraries to expand the storage apparatus.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the storage units are not limited to tape cassette and tape device system, such as the tape cassettes 122 and the tape storage devices 116 and can be units containing disc drive magazines or other storage media and cooperating devices while still maintaining substantially the same functionality without departing from the scope and spirit of the present invention. Further, this apparatus could be configured in a circle, side by side or stacked, just to name a few arrangements of units in proximity without departing from the scope and spirit of the present invention. Also, though the media element described herein is a tape cassette, such as the tape cassette 122, the media element could also be a plurality of tape cassettes held in a cassette magazine, a random access memory device such as a disc drive or a flash memory device for example or a random access medium such as a floppy disc or an optical disc to be used with a drive system capable of reading and recording data on the random access medium just to name a few examples without departing from the scope and spirit of the present invention. Finally, although the preferred embodiments described herein are directed to storage units, such as unit 100, for use in a storage apparatus, such as storage apparatus 300, and related technology, it will be appreciated by those skilled in the art that the teachings of the present invention can be applied to other systems, such as other kinds of storage cabinets having storage media sharing requirements between cabinets in an expandable apparatus without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An expandable storage apparatus comprising:
   a first storage unit and a second storage unit, each of said storage units comprising media support locations, and each of
   said support locations capable of supporting at least one storage media element;
   at least one storage device adapted to store and retrieve data to and from at least one of said storage media elements associated with at least one of said storage units;
   a first media pass-through transfer device in a mounting relationship with said first storage unit but not permanently mounted with said second unit such that said media pass-through transfer device is substantially disposed in said first storage unit and adapted to transfer said storage media element between said first storage unit and second storage unit wherein said first media pass-through transfer device is capable of temporarily extending into said second storage unit;
   at least one robotic system, separate from said first media pass-through transfer device, associated with each of said storage units, said robotic system capable of transferring said storage media elements between at least said support locations, said storage device and said first media pass-through transfer device.

2. The apparatus of claim 1 further comprising:
   a first surface comprising a first opening associated with said first storage unit;
   a second surface comprising a second opening associated with said second storage unit;
   a pathway between said first and second storage units established when said first and second surfaces are in proximity and said first and second openings are substantially aligned wherein said pathway is adapted to accommodate said transfer of said storage media element between said first and second storage units.

3. The apparatus of claim 2 wherein at least one of said first and second surfaces comprises a knock-out panel capable of being removed to expose at least one of said first and second openings.

4. The apparatus of claim 1 wherein said first media pass-through transfer device transfers said storage media element between said first and second storage units in a non-linear motion.

5. The apparatus of claim 4 wherein said first media pass-through transfer device is operable to pivot said media between said first and second storage units.

6. The apparatus of claim 1 wherein said first media pass-through transfer device is a telescoping device.

7. The apparatus of claim 1 wherein said first and second storage units are capable of cooperating in a stacked arrangement.

8. The apparatus of claim 1 further comprising:
a third storage unit configured substantially like said first and second storage units;
a second media pass-through transfer device disposed in either said second or said third storage units and adapted to transfer said storage element between said second and said third storage units wherein said second media pass-through transfer device is capable of temporarily extending into either said second or said third storage unit.

9. The apparatus of claim 8 wherein said storage units are arranged in a stacked configuration in an order from said first to said second to said third storage units and wherein a first pathway is established between said first and second storage units and a second pathway is established between said second and third storage units wherein said pathway is adapted to accommodate said transfer of said storage media element between said first and second storage units and said second and third units.

10. The apparatus of claim 1 wherein said first media pass-through transfer device is modular.

11. The apparatus of claim 1 wherein said storage media element is from the group consisting of: a tape cassette, a tape cassette magazine, a random access medium, and a random access device.

12. A method for extending storage capacity of a storage apparatus comprising:
positioning a first and a second storage unit to cooperate with one another, said first and said second storage units each possessing at least one robot that transfers storage media elements within said respective storage units, wherein said first storage unit comprises a media pass-through transfer device, separate from said robots, capable of holding a storage media element, said media pass-through transport device in a mounting relationship with said first storage unit but not permanently mounted with said second unit such that said media pass-through transport device is capable of being substantially housed within said first storage unit;
extending said media pass-through transfer device at least partially into said second storage unit; and
transferring said storage media element between said first and second storage units with said media pass-through transfer device.

13. The method of claim 12 further comprising moving said storage media element from said media pass-through transfer device to at least one support location located within each of said units and at least one storage device adapted to transfer data to and from said storage media element.

14. The method of claim 12 wherein said positioning step is accomplished by stacking said first and second storage units.

15. The method of claim 12 further comprising disposing said media pass-through transfer device substantially in said first storage unit and extending said media pass-through transfer device temporarily in said second storage unit.

16. The method of claim 12 further comprising passing said media element through an opening between said first and second units via said media pass-through transfer device.

17. A media transfer system comprising:
a media pass-through transfer device adapted to be predominantly mounted in a first storage unit;
said media pass-through transfer device adapted to receive a media element from a first robotic system cooperating with said first storage unit, said first robotic system is separate from said media pass-through transfer device;
said media pass-through transfer device capable of extending temporarily into a second storage unit wherein said media pass-through transfer device is not permanently in said second storage unit;
said media pass-through transfer device capable of transferring said media element to said second storage unit; and
said media pass-through transfer device adapted to transfer said media element to a second robotic system associated with said second storage unit, said second robotic system is separate and not directly attached to said media pass-through transfer device.

18. The media transfer system of claim 17 media pass-through transfer device is operable to pivot said media between said first and second storage units.

19. The media transfer system of claim 17 wherein said media pass-through transfer device is a telescoping device.

20. The media transfer system of claim 17 wherein said media pass-through transfer device is adapted to extend through an accommodating pathway established between said first and said second storage units when positioned in proximity.

21. An expandable media library comprising:
a first library unit including at least one of a media support location, a storage device, and a robot for transferring said storage device to and from said media support location;
a second library unit disposed adjacent to the first library and including at least one of a media support location, a storage device, and a robot for transferring said storage device to and from said media support location;
a media pass-through transfer device that is a separate device from said at least one robot, said media pass-through transfer device in a mounted relationship with said first library unit but not in a permanent mounting relationship with said second library unit such that said media pass-through transfer device is housed substantially within the first library, wherein the media pass-through transfer device is movable from a first position substantially within the first library to a second position substantially within the second library.

22. A method for increasing available storage in a library unit storage system, comprising the steps of:
providing an additional library unit;
positioning the additional library unit adjacent to the storage system; and
aligning the additional library unit with the storage system so that a storage media element is capable of being passed between the storage system and the additional library unit using a means for passing media; and
mounting said means for passing media to either said storage system or said additional library unit wherein said means for passing media is substantially within either said storage system or said additional library unit, respectively.

* * * * *